G. M. SMITH.
TRACTOR.
APPLICATION FILED SEPT. 28, 1920.

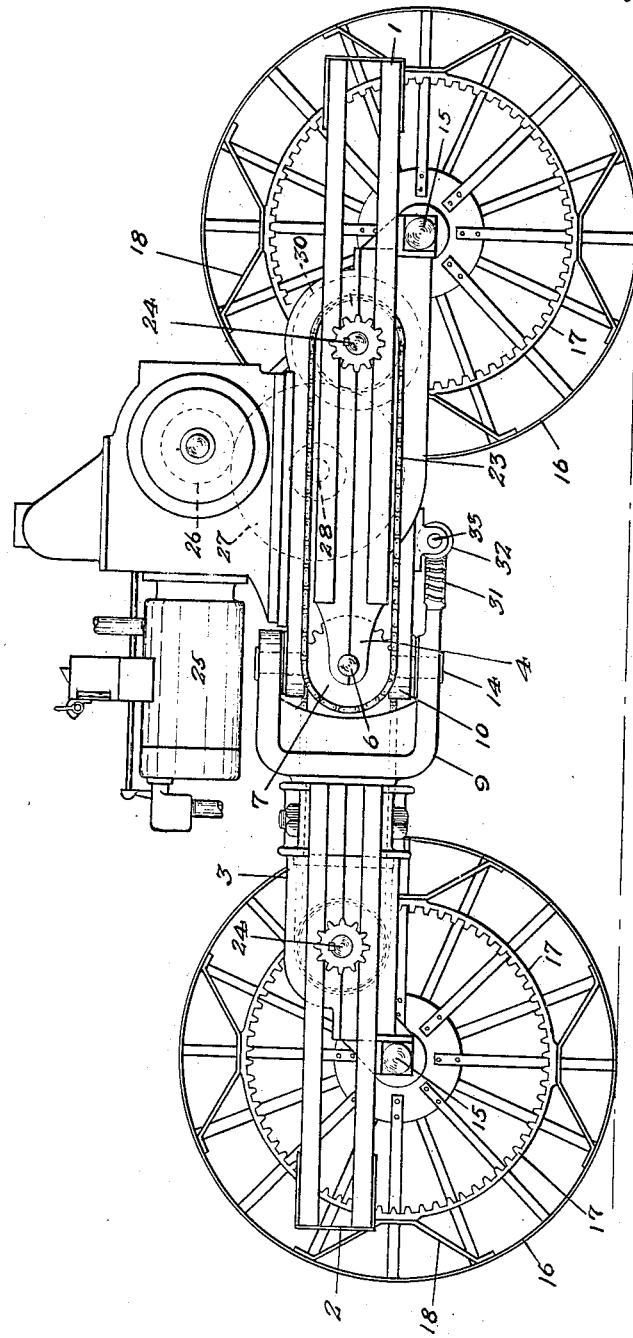

1,373,981.

Patented Apr. 5, 1921.
3 SHEETS—SHEET 3.

Inventor
G. M. Smith
By Victor J. Evans
Attorney

UNITED STATES PATENT OFFICE.

GEORGE M. SMITH, OF CLEVELAND, OHIO.

TRACTOR.

1,373,981.　　　　　Specification of Letters Patent.　　Patented Apr. 5, 1921.

Application filed September 28, 1920. Serial No. 413,318.

*To all whom it may concern:*

Be it known that I, GEORGE M. SMITH, a citizen of the United States, residing at Cleveland, in the county of Cuyahoga and State of Ohio, have invented new and useful Improvements in Tractors, of which the following is a specification.

This invention relates to improvements in tractors, one of the objects of the invention being to provide means for driving all four wheels of the tractor and also for permitting the tractor to turn on a small radius.

Another object of the invention is to form the frame of the tractor in two parts with a pivotal connection between the two parts and also to provide means for making the connection a flexible one so as to facilitate the traveling of the tractor over rough ground.

Still another object of the invention is to provide a novel construction of the differential housing and its connection with the drive wheel so as to transmit power to all four wheels without interfering with the steering of the device.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Fig. 2 is an elevation thereof.

Figure 1:
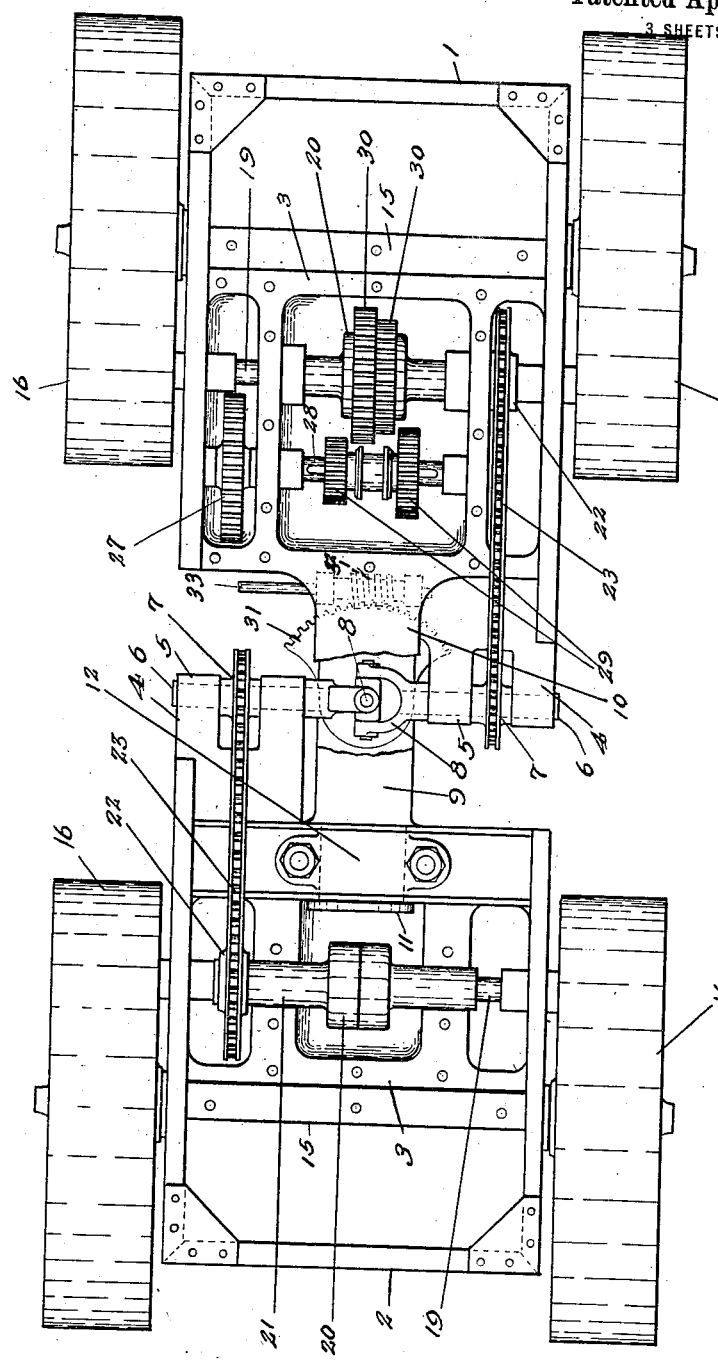
Figure 1 is a plan view of the invention.
Figure 3:
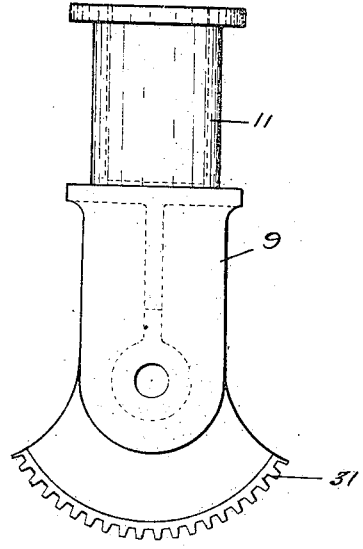
Figs. 3 and 4 are detail views of the front connecting fork.
Figure 4:
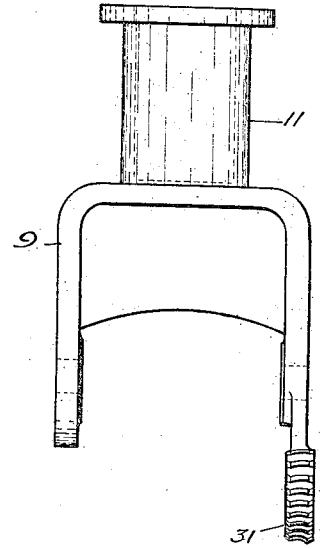

In these views 1 indicates the rear frame and 2 the front frame, each frame being provided with the gear case 3 and with a forked extension 4 at its inner end, said extension being located adjacent one side of the frame and the extensions on the two frames being oppositely arranged. The forks of each extension form bearings 5 for receiving the shaft 6. Each shaft carries a sprocket 7 which is arranged between the prongs of the fork. The two shafts are connected together by the universal joint 8.

The two frames are connected together by the forked members 9 and 10, the member 9 being rotatably supported in the front frame 2 by having its cylindrical part 11 rotatably supported in the cross piece 12 of the frame 2. The prongs of the two forked members are connected together by the pins 14 and these pins are in alinement with the knuckle of the universal joint.

Each frame is mounted on an axle 15, the spindles of which carry the wheels 16 and each wheel is provided with a ring gear 17 which is supported by the brackets 18. Each frame is also provided with the jack shaft 19 which is formed in two parts connected together by the differential 20. One-half of the housing of the differential is provided with an extension 21, on the outer end of which is secured a sprocket 22 and a chain 23 connects this sprocket, of each frame, with the sprocket 7 on shaft 6. Each jack shaft at its ends carries the pinions 24 which mesh with the ring gears 17.

The rear frame carries the motor 25, the gear 26 on the crank shaft thereof meshing with a gear 27 on the shaft 28 journaled in the rear frame. This shaft 28 carries the sliding gears 29 which are adapted to mesh with the gears 30 on the housing of the rear jack shaft. By shifting the gears 29 on the shaft by any suitable means the tractor may be driven at different speeds.

The forked member 9 has a toothed quadrant 31 on its lower prong which is engaged by the worm 32 on shaft 33 which is suitably connected with the steering post. This shaft 33 is journaled on the lower part of the forked member 10.

It will thus be seen that when the shaft 28 is being driven by the motor and one of the gears 29 is in mesh with one of the gears 30 all four wheels of the tractor will be rotated through the shafts 19, the pinions and the ring gears 17, the front shaft being driven through the sprockets and chains and the shafts 6. As the pivotal point between the two frames is in alinement with the universal joint the tractor can make turns without interfering with the transmission of the power from one of the jack shafts to the other and the swiveling of the forked member 9 in the front frame will permit said front frame to tilt when traveling over rough ground without interfering with the transmission of the power to the drive wheels.

Figure 5:
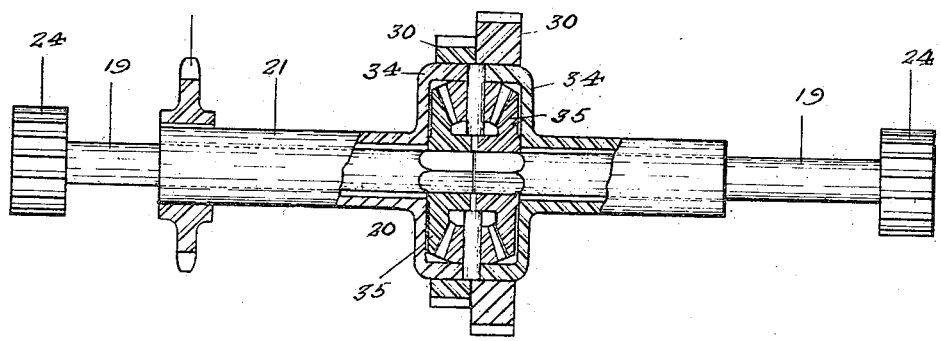
Fig. 5 is a view partly in section of the drive means for the rear wheels.

As will be seen from Fig. 5 the two halves 34 of the axle housing carry the gears 30 and the two parts of the jack shaft 19 have the gears 35 of the differential secured to the inner ends. It will be seen from this construction that the gears 30 will drive the sprocket 22 positively and will not interfere with the functioning of the jack shaft 19. The two parts of this jack shaft are driven directly through the differential gearing independently of the sprocket 22 which transmits power to the front wheels.

By my invention the tractor can turn in a small radius and the transmission of power from the motor to the four wheels will not interfere with the steering of the device.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A tractor of the class described comprising a frame formed of two parts, means for pivotally connecting the two parts together so that they can move about a vertical axis, an axle supporting each part, wheels carried by each of said axles, a drive shaft on each part, gears connecting the same with the wheels, each shaft being formed of two parts and a differential connecting these two parts together, a sprocket connected with a part of the differential housing, an extension on the inner end of each frame part, a horizontally arranged shaft carried by each extension, a universal joint connecting the inner ends of the two shafts together, a sprocket on each shaft, a chain connecting the sprocket on each horizontal shaft with the sprocket on the differential, gears of different sizes on the differential housing of the drive shaft of the rear frame part, a power driven shaft and slidable gears thereon for engaging with the gears on the differential.

In testimony whereof I affix my signature.

GEORGE M. SMITH.